United States Patent
Ni et al.

(10) Patent No.: US 9,450,730 B2
(45) Date of Patent: Sep. 20, 2016

(54) METHOD AND DEVICE FOR ALLOCATING PHYSICAL HYBRID ARQ INDICATOR CHANNEL, AND USER EQUIPMENT

(71) Applicant: HUAWEI TECHNOLOGIES CO., LTD., Shenzhen (CN)

(72) Inventors: Wei Ni, Shenzhen (CN); Jiayin Zhang, Shanghai (CN); Xiaotao Ren, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 92 days.

(21) Appl. No.: 14/176,372

(22) Filed: Feb. 10, 2014

(65) Prior Publication Data

US 2014/0153527 A1    Jun. 5, 2014

Related U.S. Application Data

(63) Continuation of application No. PCT/CN2012/079852, filed on Aug. 8, 2012.

(30) Foreign Application Priority Data

Aug. 10, 2011    (CN) .......................... 2011 1 0228847

(51) Int. Cl.
*H04L 5/00* (2006.01)
*H04W 72/04* (2009.01)
*H04L 1/18* (2006.01)

(52) U.S. Cl.
CPC ........... *H04L 5/0053* (2013.01); *H04L 1/1861* (2013.01); *H04L 1/1864* (2013.01);

(Continued)

(58) Field of Classification Search
None
See application file for complete search history.

(56) References Cited

U.S. PATENT DOCUMENTS

2009/0196240 A1    8/2009  Frederiksen et al.
2009/0268685 A1*  10/2009  Chen .................... H04L 1/1854
                                                                                370/329

(Continued)

FOREIGN PATENT DOCUMENTS

CN    101465720 A    6/2009
CN    101702644 A    5/2010

(Continued)

OTHER PUBLICATIONS

Chinese Office Action mailed Aug. 8, 2014, in corresponding Chinese Patent Application No. 201110228847.1.

(Continued)

*Primary Examiner* — Candal Elpenord
(74) *Attorney, Agent, or Firm* — Staas & Halsey LLP

(57) ABSTRACT

Embodiments of the present invention disclose a method and a device for allocating a physical hybrid ARQ indicator channel, and a user equipment. The method for allocating a physical hybrid ARQ indicator channel includes: determining, according to an extended parameter, a cyclic shift value of a demodulation reference signal that is indicated in a Physical Downlink Control Channel PDCCH, and a minimum labeling index value of a physical resource block PRB that is occupied by an uplink data transmission block, a PHICH index number that corresponds to the uplink data transmission block, where the extended parameter includes a cell-specific parameter and a user-equipment-specific parameter; and allocating a PHICH to the uplink data transmission block according to the PHICH index number.

18 Claims, 2 Drawing Sheets

Determine, according to an extended parameter, a cyclic shift value of a demodulation reference signal that is indicated in a Physical Downlink Control Channel PDCCH, and a minimum labeling index value of a physical resource block PRB that is occupied by an uplink data transmission block, a PHICH index number that corresponds to the uplink data transmission block, where the cyclic shift value and the minimum labeling index value are indicated in a Physical Downlink Control Channel PDCCH, and the extended parameter includes a cell-specific parameter and a user-equipment-specific parameter — 31

Determine, through the PHICH index number, a corresponding PHICH to be allocated to the uplink data transmission block — 32

Receive, on the determined PHICH, response and feedback information that corresponds to the uplink data transmission block — 33

(52) U.S. Cl.
CPC ........... *H04L1/1893* (2013.01); *H04L 1/1896* (2013.01); *H04L 1/1812* (2013.01); *H04L 1/1887* (2013.01); *H04W 72/0413* (2013.01)

(56) References Cited

U.S. PATENT DOCUMENTS

| | | | | |
|---|---|---|---|---|
| 2010/0195583 | A1* | 8/2010 | Nory ..................... | H04L 1/1854 370/329 |
| 2011/0170499 | A1 | 7/2011 | Nayeb Nazar et al. | |
| 2011/0206014 | A1* | 8/2011 | Lee ....................... | H04L 1/1861 370/335 |
| 2012/0120882 | A1* | 5/2012 | Luo ....................... | H04L 5/0053 370/329 |
| 2013/0183987 | A1* | 7/2013 | Vrzic .................... | H04L 1/0046 455/450 |
| 2013/0250864 | A1* | 9/2013 | Zhang ................. | H04W 72/042 370/329 |
| 2013/0336256 | A1 | 12/2013 | Chung et al. | |

FOREIGN PATENT DOCUMENTS

| | | |
|---|---|---|
| CN | 101848544 | 9/2010 |
| CN | 102036388 | 4/2011 |
| CN | 102106097 A | 6/2011 |
| CN | 102137496 A | 7/2011 |

OTHER PUBLICATIONS

Chinese Office Action dated Apr. 22, 2015 in corresponding Chinese Patent Application No. 201110228847.1.
R1-101412 "PHICH resources in LTE-Advanced", Document of *3GPP TSG RAN WG1 Meeting* #60, Feb. 22-26, 2010, pp. 1-5, Agenda Item 7.1.2, Nokia and Nokia Siemens Networks, San Francisco, California, USA.
International Search Report issued Sep. 27, 2012, in corresponding International Patent Application No. PCT/CN2012/079852.
Extended European Search Report issued on Jul. 2, 2014 in corresponding European Patent Application No. 12 822 050.6.
Alcatel-Lucent Shanghai Bell et al: "Cyclic Shift Mapping of PHICH Resources for UL MIMO", 3GPP Draft; R1-102796, 3$^{rd}$ Generation Partnership Project (3GPP), Mobile Compentence Centre; 650, Route Des Lucioles; F-06921 Sophia-Antipolis Cedex; France, vol. RAN WG1, No. Montreal Canada; 20100510, May 4, 2010 XP0419968.
Alcatel-Lucent et al: PHICH resource allocation in LTE-A, 3GPP Draft; R1-102780 PHICH RA Final, 3$^{rd}$ Generation Partnership Project (3GPP), Mobile Competence Centre; 650, Route Des Lucioles; F-06921 Sophia-Antipoules Cedex; France, vol. RAN WG, No. Montreal Canada, 20100510, May 4, 2010, XP050419959.
International Search Report mailed Sep. 27, 2012, in corresponding International Application No. PCT/CN2012/079852.

* cited by examiner

METHOD AND DEVICE FOR ALLOCATING PHYSICAL HYBRID ARQ INDICATOR CHANNEL, AND USER EQUIPMENT

CROSS-REFERENCE TO RELATED APPLICATION

This application is a continuation of International Application No. PCT/CN2012/079852, filed on Aug. 8, 2012, which claims priority to Chinese Patent Application No. 201110228847.1, filed on Aug. 10, 2011, both of which are hereby incorporated by reference in their entireties.

TECHNICAL FIELD

The present invention relates to the field of communications technologies, and in particular, to a method and a device for allocating a physical hybrid ARQ indicator channel, and a user equipment.

BACKGROUND

In the LTE (Long Term Evolution, long term evolution) technology, sending/receiving of data supports the HARQ (Hybrid Automatic Repeat Request, hybrid automatic repeat request) technology. A data receiving party feeds back ACK (acknowledgement, positive acknowledgement)/NACK (Negative acknowledgement, negative acknowledgement) information to a data sending party, so that the data sending party confirms whether data is correctly received by the data receiving party.

Generally, an eNodeB (base station) carries ACK or NACK information of an HARQ on a PHICH (Physical Hybrid ARQ Indicator Channel, Physical Hybrid ARQ Indicator Channel) that is allocated to a UE (User Equipment, user equipment), so as to indicate whether the eNodeB has correctly received uplink data that is transmitted by the UE. Correspondingly, the UE needs to determine the PHICH, and acquires, through the PHICH, the ACK or NACK information of uplink data transmission.

However, currently a DMRS (Demodulation Reference Signal, demodulation reference signal) used to determine a PHICH has relatively a few cyclic shift values, which can determine at most eight PHICHs. Once there are more UEs in uplink multiplexing, a PHICH configuration requirement cannot be met. This may lead to a PHICH allocation conflict, and two UEs will determine a same PHICH, causing a wrong judgment of uplink data transmission and lowering transmission quality.

SUMMARY

An objective of embodiments of the present invention is to provide a method and a device for allocating a physical hybrid ARQ indicator channel, and a user equipment, so as to improve the capability of allocating a physical hybrid ARQ indicator channel.

The objective of the embodiments of the present invention is achieved through the following technical solutions:

According to one aspect, an embodiment of the present invention provides a method for allocating a physical hybrid ARQ indicator channel, including:

determining, according to an extended parameter, a cyclic shift value of a demodulation reference signal that is indicated in a Physical Downlink Control Channel PDCCH, and a minimum labeling index value of a physical resource block PRB that is occupied by an uplink data transmission block, a PHICH index number that corresponds to the uplink data transmission block, where the extended parameter includes a cell-specific parameter and a user-equipment-specific parameter; and allocating a PHICH to the uplink data transmission block according to the PHICH index number.

According to another aspect, an embodiment of the present invention provides a device for allocating a physical hybrid ARQ indicator channel, including:

a first determining unit, configured to determine, according to an extended parameter, a cyclic shift value of a demodulation reference signal that is indicated in a Physical Downlink Control Channel PDCCH, and a minimum labeling index value of a physical resource block PRB that is occupied by an uplink data transmission block, a PHICH index number that corresponds to the uplink data transmission block, where the extended parameter includes a cell-specific parameter and a user-equipment-specific parameter; and an allocating unit, configured to allocate a PHICH to the uplink data transmission block according to the PHICH index number.

According to one aspect, an embodiment of the present invention provides a method for allocating a physical hybrid ARQ indicator channel, including:

determining, according to an extended parameter, a cyclic shift value of a demodulation reference signal that is indicated in a Physical Downlink Control Channel PDCCH, and a minimum labeling index value of a physical resource block PRB that is occupied by an uplink data transmission block, a PHICH index number that corresponds to the uplink data transmission block, where the extended parameter includes a cell-specific parameter and a user-equipment-specific parameter;

determining, through the PHICH index number, a corresponding PHICH to be allocated to the uplink data transmission block; and receiving, on the determined PHICH, acknowledgement information that corresponds to the uplink data transmission block.

According to another aspect, an embodiment of the present invention provides a user equipment, including:

a second determining unit, configured to determine, according to an extended parameter, a cyclic shift value of a demodulation reference signal that is indicated in a Physical Downlink Control Channel PDCCH, and a minimum labeling index value of a physical resource block PRB that is occupied by an uplink data transmission block, a PHICH index number that corresponds to the uplink data transmission block, where the extended parameter includes a cell-specific parameter and a user-equipment-specific parameter;

a third determining unit, configured to determine, through the PHICH index number, a corresponding PHICH to be allocated to the uplink data transmission block; and a receiving unit, configured to receive, on the determined PHICH, acknowledgement information that corresponds to the uplink data transmission block.

As can be seen from the technical solutions according to the embodiments of the present invention, through an extended parameter and a cyclic shift value of a demodulation reference signal, an adjustment range is widened when a base station allocates a PHICH channel to a UE.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
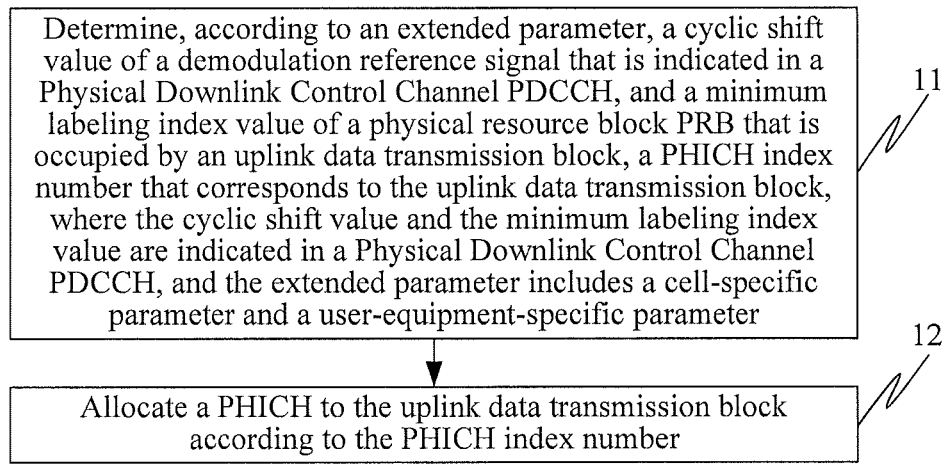
FIG. 1 is a schematic flowchart 1 of a method for allocating a physical hybrid ARQ indicator channel according to an embodiment of the present invention.

As shown in FIG. 1, an embodiment of the present invention provides a method for allocating a physical hybrid ARQ indicator channel, including:

11. Determine, according to an extended parameter, a cyclic shift value of a demodulation reference signal that is indicated in a PDCCH (Physical Downlink Control Channel, Physical Downlink Control Channel), and a minimum labeling index value of a PRB (Physical Resource Block, physical resource block) that is occupied by an uplink data transmission block, a PHICH (Physical Hybrid ARQ Indicator Channel, Physical Hybrid ARQ Indicator Channel) index number that corresponds to the uplink data transmission block, where the extended parameter includes a cell-specific parameter and a user-equipment-specific parameter.

12. Allocate a PHICH to the uplink data transmission block according to the PHICH index number.

In the embodiment of the present invention, the method for allocating a physical hybrid ARQ indicator channel may be executed by a base station, such as an eNodeB (Evolved NodeB, evolved NodeB) in an LTE system. The eNodeB allocates a PHICH to an uplink data transmission block that is transmitted by a UE (User Equipment, user equipment), so that ACK or NACK information of uplink data transmission is fed back on the PHICH.

As can be seen from the technical solution according to the embodiment of the present invention, through an extended parameter and a cyclic shift value of a demodulation reference signal, an adjustment range is widened when a base station allocates a PHICH channel to a UE.

The following briefly describes technologies involved in the method for allocating a physical hybrid ARQ indicator channel according to the embodiment of the present invention:

In an LTE system, a process where a user equipment sends data to a base station is as follows: The user equipment receives, from a PDCCH channel, a PUSCH (Physical Uplink Shared Channel, Physical Uplink Shared Channel) scheduling authorization command that is delivered by the base station; the base station allocates, through a minimum labeling number $I_{PRB\_RA}$ of a resource block that is occupied by a Physical Uplink Shared Channel and cyclic shift information of an uplink demodulation pilot that is indicated by $n_{DMRS}$ a downlink PHICH channel to the user equipment, where both $I_{PRB\_RA}$ and $n_{DMRS}$, are indicated in the Physical Uplink Shared Channel scheduling authorization command that is carried on the PDCCH channel; the user equipment sends a data transmission block to the base station on the allocated Physical Uplink Shared Channel, and the base station receives the data transmission block on the Physical Uplink Shared Channel that is allocated to the user equipment and determines whether the data transmission block has been correctly received; if the base station has correctly received the data transmission block, ACK information is sent to the user equipment on the allocated physical downlink PHICH channel, or otherwise NACK information is sent to the user equipment on the allocated physical downlink PHICH channel; correspondingly, the user equipment receives, on the allocated downlink PHICH channel, the ACK/NACK information that is fed back by the base station; and if the ACK information has been received and the user equipment confirms that the base station has correctly received the data transmission block, the data transmission block is no longer sent; or if the NACK information is received and the maximum number of retransmissions is not reached, the data transmission block is repeatedly sent to the base station.

A PHICH channel resource is allocated in the unit of groups, and the number $N_{PHICH}^{group}$ of PHICH groups is determined by information that is indicated in system broadcast signaling. Under a common CP (Cyclic Prefix, cyclic prefix), each PHICH group includes eight PHICHs, and under an extended cyclic prefix, each PHICH group includes four PHICHs.

Optionally, in step 11, the extended parameter includes a user-equipment-specific (UE-specific) parameter.

Specifically, a base station may transmit, through the PDCCH or higher-layer signaling, the user-equipment-specific parameter to a user equipment. The user-equipment-specific parameter may occupy an existing field of the PDCCH or a newly-added field, and the user-equipment-specific parameter may occupy one or more fields.

For example, a field that is occupied by the user-equipment-specific parameter is A bits, which may indicate at most $2^A$ values, whereas a field that indicates the cyclic shift value of the demodulation reference signal is 3 bits, which can indicate at most eight (that is, $2^3$) values. In this way, a value range that is indicated together by a value of the user-equipment-specific parameter and the cyclic shift value of the demodulation reference signal is obviously widened, so that an adjustment range can be widened when the base station allocates a PHICH channel to the user equipment.

Optionally, in step 11, the extended parameter includes a cell-specific (CELL-specific) parameter and a user-equipment-specific parameter.

Specifically, a base station may transmit the cell-specific parameter to a user equipment through the PDCCH, where the cell-specific parameter may occupy an existing field of the PDCCH or a newly-added field; or the cell-specific parameter is configured on the user equipment through higher-layer signaling.

For different user equipments in a same cell, a value of the cell-specific parameter is the same. For user equipments in different cells, the value of the cell-specific parameter may be different. For example, a cell-specific parameter value k in the following description equals an upper limit on the number of UEs that can be accommodated by an RRH (Radio Remote Head, radio remote head) at which a UE resides. For user equipments in different cells, the value of the cell-specific parameter may also be the same. That is, the value of the cell-specific parameter is a constant value, for example, the cell-specific parameter value $k=2N_{SF}^{PHICH}$ in the following description. In this case, the base station and the user equipment may negotiate the value k in advance, and then the base station may no longer transmit the cell-specific parameter to the user equipment.

When the extended parameter includes the cell-specific parameter and the user-equipment-specific parameter, a value range that is indicated together by a value of the extended parameter and the cyclic shift value of the demodulation reference signal may be widened, so that an adjustment range can be widened when the base station allocates a PHICH channel to the user equipment.

In addition, when the value range that is indicated together by the extended parameter and the cyclic shift value of the demodulation reference signal is widened, the number of bits of the field that is occupied by the user-equipment-specific parameter may be saved through the cell-specific parameter. For example, the field that is occupied by the user-equipment-specific parameter is one bit, which can indicate at most two values (such as 0 or 1), and the field that indicates the cyclic shift value of the demodulation reference signal is three bits, which can indicate at most eight values (such as 0 to 7). When the cell-specific parameter is used, for example, when the cell-specific parameter is 8 and the extended parameter includes the cell-specific parameter and the user-equipment-specific parameter, the extended parameter indicates two values such as 0 or 8 (0 or 1 multiplied by 8). Then a value that is indicated together by the extended parameter and the cyclic shift value of the demodulation reference signal may be 0 to 15. As can be seen, the value range that is indicated together by the extended parameter and the cyclic shift value of the demodulation reference signal may also be appropriately widened, without needing to increase the number of bits of the field that is occupied by the user-equipment-specific parameter.

Optionally, the determining a PHICH index number that corresponds to the uplink data transmission block specifically includes:

determining, according to the following formula, the PHICH index number that corresponds to the uplink data transmission block, where the PHICH index number includes an index group number and an index sequence number:

$$n_{PHICH}^{group} = [I_{PRB\_RA} + n_{DMRS} + k \cdot n)] \bmod N_{PHICH}^{group} + I_{PHICH} N_{PHICH}^{group}$$

$$n_{PHICH}^{seq} = \{[I_{PRB\_RA}/N_{PHICH}^{group}] + n_{DMRS} + k \cdot n)\} \bmod 2N_{SF}^{PHICH} \quad \text{Formula (1)}$$

where $n_{PHICH}^{group}$ is the index group number, $n_{PHICH}^{seq}$ is the index sequence number, $n_{PHICH}^{group}$ is the number of PHICH groups, $N_{SF}^{PHICH}$ is a spreading factor, k is a value of the cell-specific parameter, n is a value of the user-equipment-specific parameter, $n_{DMRS}$ is the cyclic shift value of the demodulation reference signal, k·n is the value of the extended parameter, $I_{PRB\_RA}$ is the minimum labeling index of the PRB that is occupied by the uplink data transmission block or an index that is obtained after the minimum labeling index is incremented by one, $I_{PHICH}$ is set to 1 when the uplink data transmission block is transmitted in a $4^{th}$ or a $9^{th}$ subframe in uplink-downlink subframe configuration 0 of a time division duplex TDD system, or set to 0 in other cases, and mod is a modulus operation.

Optionally, the value of the user-equipment-specific parameter is a preset value; or the value of the user-equipment-specific parameter is a corresponding value that is determined by a radio remote head RRH at which a user equipment resides; or the value of the user-equipment-specific parameter is a corresponding value that is determined by a group in which the UE resides, where UEs in a same RRH are a same group or UEs that feed back a same PMI (Precoding Matrix Indicator, precoding matrix indicator) are a same group.

Optionally, the cell-specific parameter $k=2N_{SF}^{PHICH}$; or the cell-specific parameter k is an upper limit on the number of UEs that can be accommodated by the RRH at which the UE resides; or the cell-specific parameter k is the largest among upper limits on the numbers of UEs that can be accommodated by RRHs in a cell; or the cell-specific parameter k is an upper limit on the number of UEs that can be accommodated by any RRH in a cell.

As can be seen, the upper limits on the numbers of UEs that can be accommodated by RRHs in the cell are not necessarily the same. Then the largest among the upper limits on the numbers of UEs that can be accommodated by RRHs in the cell may be used, or the upper limit on the number of UEs that can be accommodated by any RRH in the cell may be used as the cell-specific parameter k.

Optionally, there are the following several manners of getting a value for the cell-specific parameter value and the user-equipment-specific parameter value but this is not limited:

Manner 1: The user-equipment-specific parameter value n is a preset value, and the cell-specific parameter value is a fixed value. For example, the cell-specific parameter value $k=2N_{SF}^{PHICH}$.

The user-equipment-specific parameter value n is a value preset by the base station, or a value n set upon pre-negotiation between the base station and the user equipment.

Manner 2: The user-equipment-specific parameter value n is a corresponding value that is determined by an RRH selected by the user equipment. In this case, the cell-specific parameter value $k=2N_{SF}^{PHICH}$, or the cell-specific parameter value k equals the upper limit on the number of UEs that can be accommodated by the RRH at which the UE resides.

The RRH is simply described as follows: In a Macro (macro site) area, all transmission points that include an RRH share a same cell ID (Identity, identity). This architecture is also called a DAS (Distributed Antenna System, distributed antenna system). Because there is no cell splitting gain, there are quite many user equipments in the cell.

The user equipment selects an RRH. For example, if multiple RRHs available for access exist, the user equipment selects an access RRH according to a principle of proximity.

Manner 3: The user-equipment-specific parameter value n is a corresponding value that is determined by a group selected by the user equipment, where user equipments in a same RRH are a same group or user equipments that feed back a same PMI (Precoding Matrix Indicator, precoding matrix indicator) are a same group. In this case, the cell-specific parameter value $k=2N_{SF}^{PHICH}$, or the cell-specific parameter value k equals a maximum number of user equipments included in the group.

The grouping of the user equipment is not limited to the foregoing two forms.

As user equipments in a user equipment group use a same PMI, the user equipments may use a same precoding matrix and a same DmRS (Demodulation Reference Signal, demodulation reference signal). In this way, the user equipments in the same user equipment group demodulate, by using the same DmRS, information that is borne in a data channel area (for example, demodulate, by using the same DmRS, the DCI that is borne on a resource area in the data channel area), thereby improving resource utilization of the data channel area.

In addition, it may be known that the value of the cell-specific parameter, the value of the user-equipment-specific parameter, and a calculation method needs to be kept consistent between the base station and the user equipment, so that the base station may determine, according to the formula (1), the PHICH that corresponds to the uplink data transmission block, and the user equipment may acquire, according to the formula (1) on the determined PHICH, a acknowledgement of a network side to a current data transmission block.

A person skilled in the art may apply, in a technical scope disclosed by the embodiment of the present invention, the method for allocating a physical hybrid ARQ indicator channel according to the embodiment of the present invention to a MIMO (Multiple-Input Multiple-Out-put, multiple-input multiple-output) transmit diversity technology.

Figure 2:
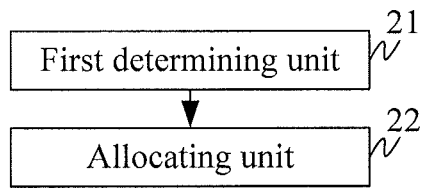
FIG. 2 is a schematic diagram 1 of composition of a device for allocating a physical hybrid ARQ indicator channel according to an embodiment of the present invention.

As shown in FIG. 2, corresponding to the method for allocating a physical hybrid ARQ indicator channel according to the foregoing embodiment, an embodiment of the present invention provides a device for allocating a physical hybrid ARQ indicator channel, including:

a first determining unit 21, configured to determine, according to an extended parameter, a cyclic shift value of a demodulation reference signal that is indicated in a Physical Downlink Control Channel PDCCH, and a minimum labeling index value of a physical resource block PRB that is occupied by an uplink data transmission block, a PHICH index number that corresponds to the uplink data transmission block, where the extended parameter includes a cell-specific parameter and a user-equipment-specific parameter; and an allocating unit 22, configured to allocate a PHICH to the uplink data transmission block according to the PHICH index number.

The device for allocating a physical hybrid ARQ indicator channel according to the embodiment of the present invention may be separately arranged, or arranged together with a base station into a whole, such as a base station eNodeB in an LTE system. The eNodeB allocates a PHICH to an uplink data transmission block that is transmitted by a UE, so that ACK/NACK information of uplink data transmission is fed back on the PHICH.

As can be seen from the technical solution according to the embodiment of the present invention, through an extended parameter and a cyclic shift value of a demodulation reference signal, an adjustment range is widened when a base station allocates a PHICH channel to a UE.

Optionally, the first determining unit 21 may be specifically configured to determine, according to the following formula, the PHICH index number that corresponds to the uplink data transmission block, where the PHICH index number includes an index group number and an index sequence number:

$$n_{PHICH}^{group} = [I_{PRB\_RA} + n_{DMRS} + k \cdot n)] \bmod N_{PHICH}^{group} + I_{PHICH} N_{PHICH}^{group}$$

$$n_{PHICH}^{seq} = \{\lfloor I_{PRB\_RA}/N_{PHICH}^{group} \rfloor + n_{DMRS} + k \cdot n)\} \bmod 2N_{SF}^{PHICH} \quad \text{Formula (1)}$$

where $n_{PHICH}^{group}$ is the index group number, $n_{PHICH}^{seq}$ is the index sequence number, $N_{PHICH}^{group}$ is the number of PHICH groups, $N_{SF}^{PHICH}$ is a spreading factor, k is a value of the cell-specific parameter, n is a value of the user-equipment-specific parameter, $n_{DMRS}$ is the cyclic shift value of the demodulation reference signal, k·n is a value of the extended parameter, $I_{PRB\_RA}$ is the minimum labeling index of the PRB that is occupied by the uplink data transmission block or an index that is obtained after the minimum labeling index is incremented by one, and $I_{PHICH}$ is set to 1 when the uplink data transmission block is transmitted in a $4^{th}$ or a $9^{th}$ subframe in uplink-downlink subframe configuration 0 of a TDD system, or set to 0 in other cases.

Optionally, the value of the user-equipment-specific parameter is a preset value; or the value of the user-equipment-specific parameter is a corresponding value that is determined by a radio remote head RRH at which a user equipment resides; or the value of the user-equipment-specific parameter is a corresponding value that is determined by a group in which the UE resides, where UEs in a same RRH are a same group or UEs that feed back a same PMI (Precoding Matrix Indicator, precoding matrix indicator) are a same group.

Optionally, the cell-specific parameter $k=2N_{SF}^{PHICH}$; or the cell-specific parameter k is an upper limit on the number of UEs that can be accommodated by the RRH at which the UE resides; or the cell-specific parameter k is the largest among upper limits on the numbers of UEs that can be accommodated by RRHs in a cell; or the cell-specific parameter k is an upper limit on the number of UEs that can be accommodated by any RRH in a cell.

Optionally, the device for allocating a physical hybrid ARQ indicator channel according to the embodiment of the present invention may further include:

a sending unit, configured to transmit, through the PDCCH or higher-layer signaling, the user-equipment-specific parameter to a UE; and transmit, through the PDCCH or the higher-layer signaling, the cell-specific parameter to the UE.

The device for allocating a physical hybrid ARQ indicator channel according to the embodiment of the present invention and its composition may be understood with reference to the actions that are executed by the base station in the method for allocating a physical hybrid ARQ indicator channel according to the foregoing embodiment, and no further details are provided herein for same content.

Figure 3:
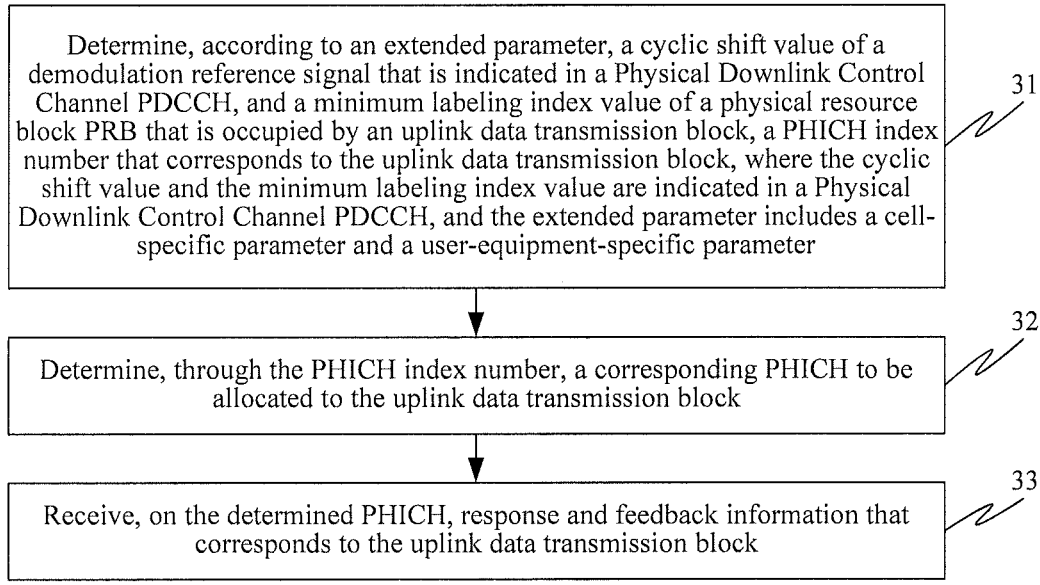
FIG. 3 is a schematic flowchart 2 of a method for allocating a physical hybrid ARQ indicator channel according to an embodiment of the present invention.

As shown in FIG. 3, an embodiment of the present invention provides a method for allocating a physical hybrid ARQ indicator channel, including:

31. Determine, according to an extended parameter, a cyclic shift value of a demodulation reference signal that is indicated in a Physical Downlink Control Channel PDCCH, and a minimum labeling index value of a physical resource block PRB that is occupied by an uplink data transmission block, a PHICH index number that corresponds to the uplink data transmission block, where the extended parameter includes a cell-specific parameter and a user-equipment-specific parameter.

32. Determine, through the PHICH index number, a corresponding PHICH to be allocated to the uplink data transmission block.

33. Receive, on the determined PHICH, acknowledgement information that corresponds to the uplink data transmission block.

The method for allocating a physical hybrid ARQ indicator channel according to the embodiment of the present invention may be executed by a user equipment UE. An eNodeB allocates a PHICH to an uplink data transmission block that is transmitted by the UE, so that ACK/NACK information of uplink data transmission is fed back on the PHICH.

As can be seen from the technical solution according to the embodiment of the present invention, through an extended parameter and a cyclic shift value of a demodulation reference signal, an adjustment range is widened when a base station allocates a PHICH channel to a UE.

Optionally, the PHICH index number that corresponds to the uplink data transmission block is determined according to the following formula, where the PHICH index number includes an index group number and an index sequence number:

$$n_{PHICH}^{group} = [I_{PRB\_RA} + n_{DMRS} + k \cdot n)] \bmod N_{PHICH}^{group} + I_{PHICH} N_{PHICH}^{group}$$

$$n_{PHICH}^{seq} = \{ \lfloor I_{PRB\_RA}/N_{PHICH}^{group} \rfloor + n_{DMRS} + k \cdot n) \} \bmod 2N_{SF}^{PHICH} \quad \text{Formula (1)}$$

where $n_{PHICH}^{group}$ is the index group number, $n_{PHICH}^{seq}$ is the index sequence number, $N_{PHICH}^{group}$ is the number of PHICH groups, $N_{SF}^{PHICH}$ is a spreading factor, k is a value of the cell-specific parameter, n is a value of the user-equipment-specific parameter, $n_{DMRS}$ is the cyclic shift value of the demodulation reference signal, k·n is a value of the extended parameter, $I_{PRB\_RA}$ is the minimum labeling index of the PRB that is occupied by the uplink data transmission block or an index that is obtained after the minimum labeling index is incremented by one, and $I_{PHICH}$ is set to 1 when the uplink data transmission block is transmitted in a $4^{th}$ or a $9^{th}$ subframe in uplink-downlink subframe configuration 0 of a TDD system, or set to 0 in other cases.

Optionally, the value of the user-equipment-specific parameter is a preset value; or the value of the user-equipment-specific parameter is a corresponding value that is determined by a radio remote head RRH at which a user equipment resides; or the value of the user-equipment-specific parameter is a corresponding value that is determined by a group in which the UE resides, where UEs in a same RRH are a same group or UEs that feed back a same PMI (Precoding Matrix Indicator, precoding matrix indicator) are a same group.

Optionally, the cell-specific parameter $k=2N_{SF}^{PHICH}$; or the cell-specific parameter k is an upper limit on the number of UEs that can be accommodated by the RRH at which the UE resides; or the cell-specific parameter k is the largest among upper limits on the numbers of UEs that can be accommodated by RRHs in a cell; or the cell-specific parameter k is an upper limit on the number of UEs that can be accommodated by any RRH in a cell.

In addition, the value of the cell-specific parameter, the value of the user-equipment-specific parameter, and a calculation method needs to be kept consistent between the base station and the user equipment, so that the base station may determine, according to the formula (1), the PHICH that corresponds to the uplink data transmission block, and the user equipment may acquire, according to the formula (1) on the determined PHICH, a acknowledgement of a network side to a current data transmission block.

Optionally, the method for allocating a physical hybrid ARQ indicator channel according to the embodiment of the present invention may further include:

acquiring, through the PDCCH or higher-layer signaling, the user-equipment-specific parameter; and acquiring, through the PDCCH or the higher-layer signaling, the cell-specific parameter.

It may be known that when the value of the cell-specific parameter is a fixed value, for example, $k=2N_{SF}^{PHICH}$ in the following description, the base station and the user equipment may negotiate a value of k in advance and then the base station may no longer transmit the cell-specific parameter to the user equipment.

A person skilled in the art may, in a technical scope disclosed by the embodiment of the present invention, apply the method for allocating a physical hybrid ARQ indicator channel according to the embodiment of the present invention to a MIMO transmit diversity technology.

Figure 4:
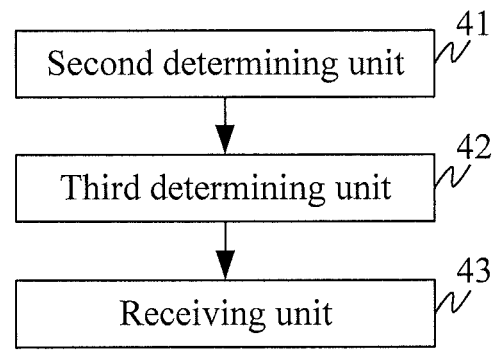
FIG. 4 is a schematic diagram 2 of composition of a device for allocating a physical hybrid ARQ indicator channel according to an embodiment of the present invention.

As shown in FIG. 4, corresponding to the method for allocating a physical hybrid ARQ indicator channel according to the foregoing embodiment, an embodiment of the present invention provides a user equipment, including:

a second determining unit 41, configured to determine, according to an extended parameter, a cyclic shift value of a demodulation reference signal that is indicated in a Physical Downlink Control Channel PDCCH, and a minimum labeling index value of a physical resource block PRB that is occupied by an uplink data transmission block, a PHICH index number that corresponds to the uplink data transmission block, where the extended parameter includes a cell-specific parameter and a user-equipment-specific parameter;

a third determining unit 42, configured to determine, through the PHICH index number, a corresponding PHICH to be allocated to the uplink data transmission block; and a receiving unit 43, configured to receive, on the determined PHICH, acknowledgement information that corresponds to the uplink data transmission block.

As can be seen from the technical solution according to the embodiment of the present invention, through an extended parameter and a cyclic shift value of a demodulation reference signal, an adjustment range is widened when a base station allocates a PHICH channel to a UE.

The second determining unit 43 may be specifically configured to determine, according to the following formula, the PHICH index number that corresponds to the uplink data transmission block, where the PHICH index number includes an index group number and an index sequence number:

$$n_{PHICH}^{group} = [I_{PRB\_RA} + n_{DMRS} + k \cdot n)] \bmod N_{PHICH}^{group} + I_{PHICH} N_{PHICH}^{group}$$

$$n_{PHICH}^{seq} = \{ \lfloor I_{PRB\_RA}/N_{PHICH}^{group} \rfloor + n_{DMRS} + k \cdot n) \} \bmod 2N_{SF}^{PHICH} \quad \text{Formula (1)}$$

where $n_{PHICH}^{group}$ is the index group number, $n_{PHICH}^{seq}$ is the index sequence number, $N_{PHICH}^{group}$ is the number of PHICH groups, $N_{SF}^{PHICH}$ is a spreading factor, k is a value of the cell-specific parameter, n is a value of the userequipment-specific parameter, $n_{DMRS}$ is the cyclic shift value of the demodulation reference signal, k·n is a value of the extended parameter, $I_{PRB\_RA}$ is the minimum labeling index of the PRB that is occupied by the uplink data transmission block or an index that is obtained after the minimum labeling index is incremented by one, and $I_{PHICH}$ is set to 1 when the uplink data transmission block is transmitted in a 4$^{th}$ or a 9$^{th}$ subframe in uplink-downlink subframe configuration 0 of a TDD system, or set to 0 in other cases.

Optionally, the value of the user-equipment-specific parameter is a preset value; or the value of the user-equipment-specific parameter is a corresponding value that is determined by a radio remote head RRH at which the user equipment resides; or the value of the user-equipment-specific parameter is a corresponding value that is determined by a group in which the UE resides, where UEs in a same RRH are a same group or UEs that feed back a same PMI (Precoding Matrix Indicator, precoding matrix indicator) are a same group.

Optionally, the cell-specific parameter $k=2N_{SF}^{PHICH}$; or the cell-specific parameter k is an upper limit on the number of UEs that can be accommodated by the RRH at which the UE resides; or the cell-specific parameter k is the largest among upper limits on the numbers of UEs that can be accommodated by RRHs in a cell; or the cell-specific parameter k is an upper limit on the number of UEs that can be accommodated by any RRH in a cell.

In addition, the value of the cell-specific parameter, the value of the user-equipment-specific parameter, and a calculation method needs to be kept consistent between the base station and the user equipment, so that the base station may determine, according to the formula (1), the PHICH that corresponds to the uplink data transmission block, and the user equipment may acquire, according to the formula (1) on the determined PHICH, a acknowledgement of a network side to a current data transmission block.

In the user equipment according to the embodiment of the present invention, the receiving unit 43 may be further configured to acquire, through the PDCCH or higher-layer signaling, the user-equipment-specific parameter; and acquire, through the PDCCH or the higher-layer signaling, the cell-specific parameter.

The user equipment according to the embodiment of the present invention and its composition may be understood with reference to the actions that are executed by the user equipment in the method for allocating a physical hybrid ARQ indicator channel according to the foregoing embodiment, and no further details are provided herein for same content.

Figure 5:
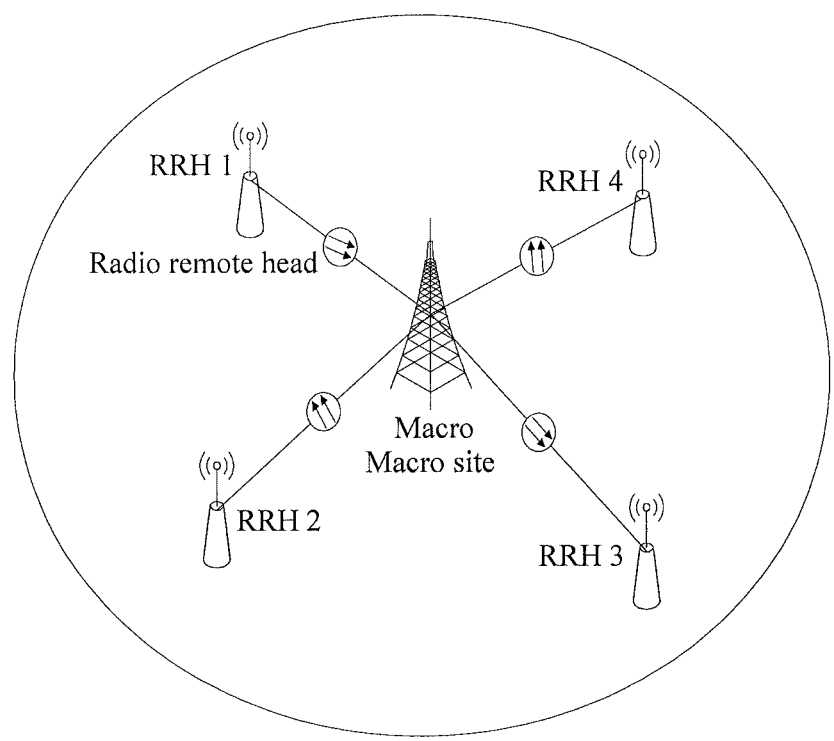
FIG. 5 is a schematic diagram of an application scenario of a method for allocating a physical hybrid ARQ indicator channel according to an embodiment of the present invention.

As shown in FIG. 5, in a manner of implementing the method and the device for allocating a physical hybrid ARQ indicator channel and implementing the user equipment according to the embodiments of the present invention in a multi-RRH cell, that is, in a distributed antenna system:

an eNodeB defines the user-equipment-specific parameter $n_X$, where a value of $n_X$ may be 0, 1, 2, . . . ; and the eNodeB defines the cell-specific parameter k, where a value of k is $2N_{SF}^{PHICH}$. The eNodeB may transfer $n_X$ and k to a UE, or the eNodeB and the UE may negotiate k as $2N_{SF}^{PHICH}$ in advance so that the UE is also capable of determining k when the eNodeB does not transfer k to the UE. The value of $n_X$ and the value of k may be transmitted in a PDCCH.

A PHICH index number that corresponds to an uplink data transmission block is determined according to the following formula:

$$n_{PHICH}^{group} = [I_{PRB\_RA} + n_{DMRS} + k \cdot n_X)] \bmod N_{PHICH}^{group} + I_{PHICH} N_{PHICH}^{group}$$

$$n_{PHICH}^{seq} = \{\lfloor I_{PRB\_RA}/N_{PHICH}^{group} \rfloor + n_{DMRS} + k \cdot n_X)\} \bmod 2N_{SF}^{PHICH} \quad \text{Formula (2)}$$

It is assumed that: a field indicating a value of $n_{DMRS}$ is 3 bits ($n_{DMRS}$ may be 0 to 7), and $2N_{SF}^{PHICH}$ is 8.

If a field indicating the value of $n_X$ is 1 bit, that is, the value of $n_X$ may be 0 or 1, $n_{dmrs}+k \cdot n$ may be 0 to 15.

If the field indicating the value of $n_X$ is 2 bits, that is, the value of $n_X$ may be 0, 1, 2, or 3, $n_{dmrs}+k \cdot n$ may be 0 to 31.

As can be seen, a value range of $n_{dmrs}+k \cdot n$ is obviously widened, so that an adjustment range can be widened when the base station allocates a PHICH channel to the UE.

The UE may perform ACK/NACK detection on the determined PHICH, so as to learn information about a acknowledgement of the base station to a current uplink data transmission block.

As shown in FIG. 5, in another manner of implementing the method and the device for allocating a physical hybrid ARQ indicator channel and implementing the user equipment according to the embodiments of the present invention in a multi-RRH cell, that is, in a distributed antenna system:

a Macro (macro site) and RRHs in a same cell are numbered, and recorded as $n_{RRH}$. A value of $n_{RRH}$ is 0, 1, 2, . . . , where $n_{RRH}$ is the user-equipment-specific parameter.

Each UE corresponds to a Macro or RRH number that serves each UE. The value of the cell-specific parameter k may be defined as $2N_{SF}^{PHICH}$, or the maximum number of UEs that are served by RRHs, or the largest among upper limits on the numbers of UEs that can be accommodated by RRHs in the cell, or an upper limit on the number of UEs that can be accommodated by any RRH in the cell. An eNodeB may transfer the value of $n_{RRH}$ and the value of k in a PDCCH to a UE.

A PHICH index number that corresponds to an uplink data transmission block is determined according to the following formula:

$$n_{PHICH}^{group} = [I_{PRB\_RA} + n_{DMRS} + k \cdot n_{RRH})] \bmod N_{PHICH}^{group} + I_{PHICH} N_{PHICH}^{group}$$

$$n_{PHICH}^{seq} = \{\lfloor I_{PRB\_RA}/N_{PHICH}^{group} \rfloor + n_{DMRS} + k \cdot n_{RRH})\} \bmod 2N_{SF}^{PHICH} \quad \text{Formula (3)}$$

It is assumed that: a field indicating a value of $n_{DRMS}$, is 3 bits ($n_{DMRS}$ may be 0 to 7), and $2N_{SF}^{PHICH}$ is 8.

If the UE selects the Macro, the value of $n_{RRH}$ equals 0 and in this case $n_{DMRS}+k \cdot n_{RRH}$ is still 0 to 7.

If the UE selects an RRH1, the value of $n_{RRH}$ equals 1 and in this case $n_{DMRS}+k \cdot n_{RRH}$ may be 0 to 15.

If the UE selects an RRH2, the value of $n_{RRH}$ equals 2 and in this case $n_{DMRS}+k \cdot n_{RRH}$ may be 0 to 23.

As can be seen, a value range of $n_{DMRS}+k \cdot n_{RRH}$ is obviously widened, so that an adjustment range can be widened when the base station allocates a PHICH channel to the UE.

The UE may perform ACK/NACK detection on the determined PHICH, so as to learn information about a acknowledgement of the base station to a current uplink data transmission block.

As shown in FIG. 5, in another manner of implementing the method and the device for allocating a physical hybrid ARQ indicator channel and implementing the user equipment according to the embodiments of the present invention in a multi-RRH cell, that is, in a distributed antenna system:

UEs in a same cell are grouped according to a certain manner. The grouping manner is not limited. For example, UEs selecting a same RRH may be classified as a group, or UEs that feed back a same PMI (that is, UEs under a same wave beam) are classified as a group.

A UE group number is defined as $n_g$, and a value of $n_g$ may be 0, 1, 2, ..., where $n_g$ is the user-equipment-specific parameter. The value of the cell-specific parameter k may be defined as $2N_{SF}^{PHICH}$, or the maximum number of UEs in a UE group. An eNodeB may transfer the value of $n_g$ and the value of k in a PDCCH to a UE.

A PHICH index number that corresponds to an uplink data transmission block is determined according to the following formula:

$$n_{PHICH}^{group} = [I_{PRB\_RA} + n_{DMRS} + k \cdot n_g)] \bmod N_{PHICH}^{group} + I_{PHICH} N_{PHICH}^{group}$$

$$n_{PHICH}^{seq} = \{\lfloor I_{PRB\_RA}/N_{PHICH}^{group} \rfloor + n_{DMRS} + k \cdot n_g)\} \bmod 2N_{SF}^{PHICH} \quad \text{Formula (4)}$$

It is assumed that: a field indicating a value of $n_{DMRS}$ is 3 bits ($n_{DMRS}$ may be 0 to 7), and $2N_{SF}^{PHICH}$ is 8.

If the UE belongs to a group 0, the value of $n_g$ equals 0 and in this case $n_{DMRS} + k \cdot n_g$ is still 0 to 7.

If the UE belongs to a group 1, the value of $n_g$ equals 1 and in this case $n_{DMRS} + k \cdot n_g$ may be 0 to 15.

If the UE belongs to a group 2, the value of $n_g$ equals 2 and in this case $n_{DMRS} + k \cdot n_g$ may be 0 to 23.

As can be seen, a value range of $n_{DMRS} + k \cdot n_g$ is obviously widened, so that an adjustment range can be widened when the base station allocates a PHICH channel to the UE.

The UE may perform ACK/NACK detection on the determined PHICH, so as to learn information about a acknowledgement of the base station to a current uplink data transmission block.

The foregoing descriptions are merely specific exemplary embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The storage medium may be a magnetic disk, an optical disc, a read-only memory (Read-Only Memory, ROM), a random access memory (Random Access Memory, RAM), or the like.

What is claimed is:

1. A method for allocating a physical hybrid (ARQ) indicator channel, comprising:
   determining, according to an extended parameter, a cyclic shift value of a demodulation reference signal that is indicated in a Physical Downlink Control Channel (PDCCH), and a minimum labeling index value of a physical resource block (PRB) that is occupied by an uplink data transmission block transmitted by a user equipment (UE), a physical hybrid ARQ indicator channel (PHICH) index number that corresponds to the uplink data transmission block, wherein the extended parameter comprises a cell-specific parameter and a user-equipment-specific parameter; and
   allocating a PHICH to the uplink data transmission block transmitted by the UE according to the PHICH index number.

2. The method for allocating a physical hybrid ARQ indicator channel according to claim 1, wherein the determining the PHICH index number that corresponds to the uplink data transmission block specifically comprises:
   determining, according to the following formula, the PHICH index number that corresponds to the uplink data transmission block, wherein the PHICH index number comprises an index group number and an index sequence number:

$$n_{PHICH}^{group} = [I_{PRB\_RA} + n_{DMRS} + k \cdot n)] \bmod N_{PHICH}^{group} + I_{PHICH} N_{PHICH}^{group}$$

$$n_{PHICH}^{seq} = \{\lfloor I_{PRB\_RA}/N_{PHICH}^{group} \rfloor + n_{DMRS} + k \cdot n)\} \bmod 2N_{SF}^{PHICH}$$

wherein $n_{PHICH}^{group}$ is the index group number, $n_{PHICH}^{seq}$ is the index sequence number, $N_{PHICH}^{group}$ is the number of PHICH groups, $N_{SF}^{PHICH}$ is a spreading factor, k is a value of the cell-specific parameter, n is a value of the user-equipment-specific parameter, $n_{DMRS}$ is the cyclic shift value of the demodulation reference signal, $I_{PRB\_RA}$ is the minimum labeling index of the PRB that is occupied by the uplink data transmission block or an index that is obtained after the minimum labeling index is incremented by one, and $I_{PHICH}$ is set to 1 when the uplink data transmission block is transmitted in a 4th or a 9th subframe in uplink-downlink subframe configuration 0 of a time division duplex (TDD) system, or set to 0 in other cases.

3. The method for allocating a physical hybrid ARQ indicator channel according to claim 1, wherein:
   the value of the user-equipment-specific parameter is a preset value; or
   the value of the user-equipment-specific parameter is a corresponding value that is determined by a radio remote head (RRH) at which the UE resides; or
   the value of the user-equipment-specific parameter is a corresponding value that is determined by a group in which the UE resides, wherein UEs in a same RRH are a same group or UEs that feed back a same precoding matrix indicator (PMI) are a same group.

4. The method for allocating a physical hybrid ARQ indicator channel according to claim 1, wherein:
   the cell-specific parameter $k = 2N_{SF}^{PHICH}$; or
   the cell-specific parameter k is a maximum number of UEs allowed to reside at an RRH at which the UE resides; or
   the cell-specific parameter k is the largest among upper limits on the numbers of UEs that can be accommodated by RRHs in a cell; or
   the cell-specific parameter k is an upper limit on the number of UEs that can be accommodated by any RRH in a cell.

5. The method for allocating a physical hybrid ARQ indicator channel according to claim 1, further comprising:
   transmitting, through the PDCCH or higher-layer signaling, the user-equipment-specific parameter to the UE; and
   transmitting, through the PDCCH or the higher-layer signaling, the cell-specific parameter to the UE.

6. A device for allocating a physical hybrid ARQ indicator channel, comprising:
   a first determining unit, configured to determine, according to an extended parameter, a cyclic shift value of a demodulation reference signal that is indicated in a Physical Downlink Control Channel (PDCCH), and a minimum labeling index value of a physical resource block (PRB) that is occupied by an uplink data transmission block transmitted by a user equipment (UE), a PHICH index number that corresponds to the uplink data transmission block, wherein the extended parameter comprises a cell-specific parameter and a user-equipment-specific parameter; and an allocating unit, configured to allocate a PHICH to the uplink data transmission block transmitted by the UE according to the PHICH index number that is determined by the first determining unit.

7. The device for allocating a physical hybrid ARQ indicator channel according to claim 6, wherein the first determining unit is specifically configured to determine, according to the following formula, the PHICH index number that corresponds to the uplink data transmission block, wherein the PHICH index number comprises an index group number and an index sequence number:

$$n_{PHICH}^{group} = [I_{PRB\_RA} + n_{DMRS} + k \cdot n)] \bmod N_{PHICH}^{group} + I_{PHICH} N_{PHICH}^{group}$$

$$n_{PHICH}^{seq} = \{\lfloor I_{PRB\_RA}/N_{PHICH}^{group} \rfloor + n_{DMRS} + k \cdot n)\} \bmod 2N_{SF}^{PHICH}$$

wherein $n_{PHICH}^{group}$ is the index group number, $n_{PHICH}^{seq}$ is the index sequence number, $N_{PHICH}^{group}$ is the number of PHICH groups, $N_{SF}^{PHICH}$ is a spreading factor, k is a value of the cell-specific parameter, n is a value of the user-equipment-specific parameter, $n_{DMRS}$ is the cyclic shift value of the demodulation reference signal, k·n is a value of the extended parameter, $I_{PRB\_RA}$ is the minimum labeling index of the PRB that is occupied by the uplink data transmission block or an index that is obtained after the minimum labeling index is incremented by one, and $I_{PHICH}$ is set to 1 when the uplink data transmission block is transmitted in a $4^{th}$ or a $9^{th}$ subframe in uplink-downlink subframe configuration 0 of a TDD system, or set to 0 in other cases.

8. The device for allocating a physical hybrid ARQ indicator channel according to claim 6, wherein the value of the user-equipment-specific parameter is a preset value; or the value of the user-equipment-specific parameter is a corresponding value that is determined by a radio remote head (RRH) at which the UE resides; or the value of the user-equipment-specific parameter is a corresponding value that is determined by a group in which the UE resides, wherein UEs in a same RRH are a same group or UEs that feed back a same precoding matrix indicator (PMI) are a same group; and the cell-specific parameter $k=2N_{SF}^{PHICH}$; or the cell-specific parameter k is an upper limit on the number of UEs that can be accommodated by the RRH at which the UE resides; or the cell-specific parameter k is the largest among upper limits on the numbers of UEs that can be accommodated by RRHs in a cell; or the cell-specific parameter k is an upper limit on the number of UEs that can be accommodated by any RRH in a cell.

9. The device for allocating a physical hybrid ARQ indicator channel according to claim 6, further comprising:
a sending unit, configured to transmit, through the PDCCH or higher-layer signaling, the user-equipment-specific parameter to the UE; and transmit, through the PDCCH or the higher-layer signaling, the cell-specific parameter to the UE.

10. A method for allocating a physical hybrid ARQ indicator channel, comprising:
determining, according to an extended parameter, a cyclic shift value of a demodulation reference signal that is indicated in a Physical Downlink Control Channel (PDCCH), and a minimum labeling index value of a physical resource block (PRB) that is occupied by an uplink data transmission block transmitted by a user equipment (UE), a PHICH index number that corresponds to the uplink data transmission block transmitted by the UE, wherein the extended parameter comprises a cell-specific parameter and a user-equipment-specific parameter; and determining, through the PHICH index number, a corresponding PHICH to be allocated to the uplink data transmission block transmitted by the UE; and receiving, on the determined PHICH, acknowledgement information that corresponds to the uplink data transmission block.

11. The method for allocating a physical hybrid ARQ indicator channel according to claim 10, wherein the determining the PHICH index number that corresponds to the uplink data transmission block specifically comprises:
determining, according to the following formula, the PHICH index number that corresponds to the uplink data transmission block, wherein the PHICH index number comprises an index group number and an index sequence number:

$$n_{PHICH}^{group} = [I_{PRB\_RA} + n_{DMRS} + k \cdot n)] \bmod N_{PHICH}^{group} + I_{PHICH} N_{PHICH}^{group}$$

$$n_{PHICH}^{seq} = \{\lfloor I_{PRB\_RA}/N_{PHICH}^{group} \rfloor + n_{DMRS} + k \cdot n)\} \bmod 2N_{SF}^{PHICH}$$

wherein $n_{PHICH}^{group}$ is the index group number, $n_{PHICH}^{seq}$ is the index sequence number, $n_{PHICH}^{group}$ is the number of PHICH groups, $N_{SF}^{PHICH}$ is a spreading factor, k is a value of the cell-specific parameter, n is a value of the user-equipment-specific parameter, $n_{DMRS}$ is the cyclic shift value of the demodulation reference signal, $I_{PRB\_RA}$ is the minimum labeling index of the PRB that is occupied by the uplink data transmission block or an index that is obtained after the minimum labeling index is incremented by one, and $I_{PHICH}$ is set to 1 when the uplink data transmission block is transmitted in a $4^{th}$ or a $9^{th}$ subframe in uplink-downlink subframe configuration 0 of a TDD system, or set to 0 in other cases.

12. The method for allocating a physical hybrid ARQ indicator channel according to claim 10, wherein the value of the user-equipment-specific parameter is a preset value; or the value of the user-equipment-specific parameter is a corresponding value that is determined by a radio remote head RRH at which the UE resides; or the value of the user-equipment-specific parameter is a corresponding value that is determined by a group in which the UE resides, wherein UEs in a same RRH are a same group or UEs that feed back a same precoding matrix indicator (PMI) are a same group.

13. The method for allocating a physical hybrid ARQ indicator channel according to claim 10, wherein:
the cell-specific parameter $k=2N_{SF}^{PHICH}$; or
the cell-specific parameter k is an upper limit on the number of UEs that can be accommodated by an RRH at which the UE resides; or
the cell-specific parameter k is the largest among upper limits on the numbers of UEs that can be accommodated by RRHs in a cell; or
the cell-specific parameter k is an upper limit on the number of UEs that can be accommodated by any RRH in a cell.

14. The method for allocating a physical hybrid ARQ indicator channel according to claim 10, further comprising:
    acquiring, through the PDCCH or higher-layer signaling, the user-equipment-specific parameter; and
    acquiring, through the PDCCH or the higher-layer signaling, the cell-specific parameter.

15. A user equipment, comprising:
    a first determining unit, configured to determine, according to an extended parameter, a cyclic shift value of a demodulation reference signal that is indicated in a Physical Downlink Control Channel (PDCCH), and a minimum labeling index value of a physical resource block (PRB) that is occupied by an uplink data transmission block transmitted by the user equipment (UE), a PHICH index number that corresponds to the uplink data transmission block transmitted by the UE, wherein the extended parameter comprises a cell-specific parameter and a user-equipment-specific parameter;
    a second determining unit, configured to determine, through the PHICH index number that is determined by the first determining unit, a corresponding PHICH to be allocated to the uplink data transmission block transmitted by the UE; and
    a receiving unit, configured to receive, on the determined PHICH, acknowledgement information that corresponds to the uplink data transmission block.

16. The user equipment according to claim 15, wherein the first determining unit is specifically configured to determine, according to the following formula, the PHICH index number that corresponds to the uplink data transmission block, wherein the PHICH index number comprises an index group number and an index sequence number:

$$n_{PHICH}^{group} = [I_{PRB\_RA} + n_{DMRS} + k \cdot n)] \bmod N_{PHICH}^{group} + I_{PHICH} N_{PHICH}^{group}$$

$$n_{PHICH}^{seq} = \{\lfloor I_{PRB\_RA}/N_{PHICH}^{group} \rfloor + n_{DMRS} + k \cdot n)\} \bmod 2N_{SF}^{PHICH}$$

wherein $n_{PHICH}^{group}$ is the index group number, $n_{PHICH}^{seq}$ is the index sequence number, $N_{PHICH}^{group}$ is the number of PHICH groups, SF is a spreading factor, k is a value of the cell-specific parameter, n is a value of the user-equipment-specific parameter, $n_{DMRS}$ is the cyclic shift value of the demodulation reference signal, k·n is a value of the extended parameter, $I_{PRB\_RA}$ is the minimum labeling index of the PRB that is occupied by the uplink data transmission block or an index that is obtained after the minimum labeling index is incremented by one, and $I_{PHICH}$ is set to 1 when the uplink data transmission block is transmitted in a $4^{th}$ or a $9^{th}$ subframe in uplink-downlink subframe configuration 0 of a TDD system, or set to 0 in other cases.

17. The user equipment according to claim 15, wherein the value of the user-equipment-specific parameter is a preset value; or the value of the user-equipment-specific parameter is a corresponding value that is determined by a radio remote head RRH at which the resides; or the value of the user-equipment-specific parameter is a corresponding value that is determined by a group in which the UE resides, wherein UEs in a same RRH are a same group or UEs that feed back a same precoding matrix indicator PMI are a same group; and
    the cell-specific parameter $k=2N_{SF}^{PHICH}$; or the cell-specific parameter k is an upper limit on the number of UEs that can be accommodated by the RRH at which the UE resides; or the cell-specific parameter k is the largest among upper limits on the numbers of UEs that can be accommodated by RRHs in a cell; or the cell-specific parameter k is an upper limit on the number of UEs that can be accommodated by any RRH in a cell.

18. The user equipment according to claim 15, wherein the receiving unit is further configured to acquire, through the PDCCH or higher-layer signaling, the user-equipment-specific parameter; and acquire, through the PDCCH or the higher-layer signaling, the cell-specific parameter.

* * * * *

UNITED STATES PATENT AND TRADEMARK OFFICE
CERTIFICATE OF CORRECTION

PATENT NO. : 9,450,730 B2  
APPLICATION NO. : 14/176372  
DATED : September 20, 2016  
INVENTOR(S) : Wei Ni et al.

Page 1 of 1

It is certified that error appears in the above-identified patent and that said Letters Patent is hereby corrected as shown below:

In the Claims

Column 18, Line 17, Claim 17:

After "which the" insert --UE--, therefor.

Signed and Sealed this
Twenty-second Day of November, 2016

Michelle K. Lee
*Director of the United States Patent and Trademark Office*